(12) United States Patent
Ishizuka (10) Patent No.: US 8,786,917 B2
(45) Date of Patent: Jul. 22, 2014

(54) IMAGE READING METHOD AND IMAGE READING APPARATUS

(75) Inventor: Haruo Ishizuka, Ichikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 353 days.

(21) Appl. No.: 13/155,138

(22) Filed: Jun. 7, 2011

(65) Prior Publication Data

US 2011/0310445 A1   Dec. 22, 2011

(30) Foreign Application Priority Data

Jun. 22, 2010   (JP) ................. 2010-141505

(51) Int. Cl.
  *H04N 1/04*   (2006.01)
  *H04N 1/46*   (2006.01)
(52) U.S. Cl.
  USPC ............ 358/498; 358/474; 358/496; 358/505
(58) Field of Classification Search
  None
  See application file for complete search history.

(56) References Cited

U.S. PATENT DOCUMENTS

2008/0179819 A1 *   7/2008   Tsai et al. ............. 271/145

FOREIGN PATENT DOCUMENTS

| JP | 2001-122532 A | 5/2001 |
| JP | 2004-043056 A | 2/2004 |
| JP | 2006-327728 A | 12/2006 |

* cited by examiner

Primary Examiner — Thierry L Pham
(74) Attorney, Agent, or Firm — Canon USA, Inc., IP Division (57) ABSTRACT

A method includes a first step, a second step, and a third step. In the first step, a fed document is returned to an upstream side of a reading unit by reversing the document after a first passage through the reading unit. In the second step, the document returned in the first step is returned to the upstream side of the reading unit by reversing the document after a second passage through the reading unit. In the third step, the document returned in the second step is passed through the reading unit, and then the document is discharged.

20 Claims, 9 Drawing Sheets

IMAGE READING METHOD AND IMAGE READING APPARATUS

BACKGROUND OF THE INVENTION

1. Field of the Invention

The present invention relates to a technology of reading an image from a two-sided document in an apparatus that includes a scanner apparatus.

2. Description of the Related Art

A copying machine, a scanner, a facsimile, or a multifunction peripheral that has functions of these devices alone includes an image reading apparatus for reading an image recorded on a sheet document, and the image reading apparatus has a document conveying mechanism for automatically conveying the document.

To read images recorded on both surfaces of the document by the image reading apparatus, there is available an image reading apparatus that automatically conveys the document by the document conveying mechanism included in the image reading apparatus to read the images from both surfaces of the document. Reading images from both surfaces of a plurality of documents by such an apparatus necessitates reversal of front and back surfaces of the documents by the document conveying mechanism. Hence, a bundle of documents discharged after the image reading may have front and back surfaces reversed, or an order from the first page to the last page may be reversed.

A document conveying mechanism of an image reading apparatus discussed in Japanese Patent Application Laid-Open No. 2004-043056 can solve such a problem. In the image reading apparatus discussed in Japanese Patent Application Laid-Open No. 2004-043056, a sheet feeding unit and a reading unit are coupled together on a reversal path, and a reversal unit (switchback unit) is disposed on the midway of the reversal path. The sheet feeding unit sequentially separates documents placed with front surfaces up from an upper side to convey the documents to the reversal path, and the reversal unit on the midway changes trailing edges to leading edges to return the documents to the reversal path. Back surfaces of the documents passed through the reversal path have become lower surfaces, and the reading unit reads images from the back surfaces.

The documents reversed at a sheet discharge unit after the reading are returned again to the reversal path. Front surfaces of the documents passed through the reversal path have become lower surfaces, and images are read from the front surfaces. The documents are then discharged to the sheet discharge unit with the front surfaces down. Thus, when two-sided documents of a plurality of pages are stacked from an upper side in order of pages, the documents are discharged from a lower side in order of pages.

When images are read from a plurality of documents, the plurality of documents are stacked on the sheet feeding unit. In a method discussed in Japanese Patent Application Laid-Open No. 2004-043056, when an operation of reading images from both surface of a document and discharging the document to the sheet discharge unit is repeated, a stacking order of the documents at the sheet feeding unit and a stacking order of the documents at the sheet discharge unit can be set similar. A speed of reading document images has a limit because of reading accuracy. Thus, by setting lower a document conveying speed at the reversal unit at the time of reversal, a period of time for a series of operations from feeding of the document through reading of images from both surfaces of the document to discharging of the document is shortened.

The image reading apparatus discussed in Japanese Patent Application Laid-Open No. 2004-043056 needs, in the document conveying mechanism, the reversal unit on the midway of the reversal path for guiding from the sheet feeding unit to the reading unit. The image reading apparatus also needs a path for returning the document reversed at the sheet discharge unit to the reversal path via the reversal unit.

In the case of one-sided reading, the document is directly conveyed from the sheet feeding unit to the reading unit. In the case of two-sided reading, however, the document is conveyed from the sheet feeding unit to the reversal unit. Hence, document conveying paths are different between the one-sided reading and the two-sided reading, thus necessitating a guide for conveying the document in a correct direction. A path from the reading unit to the sheet discharge unit and a path from the reading unit to the reversal unit are different from each other, thus necessitating separate inclusion of roller pairs for conveying the document to the respective paths. As a result, when all these components are installed, there is a problem of an increase in size of the image reading apparatus.

SUMMARY OF THE INVENTION

The present invention is directed to a method and an apparatus capable of shortening a period of time for reading document images while suppressing enlargement of a conveying mechanism for matching a stacking order of documents discharged after reading with that of documents before feeding.

According to an aspect of the present invention, a method includes: a first step of returning a fed document to an upstream side of a reading unit by reversing the document after a first passage through the reading unit; a second step of returning the document returned in the first step to the upstream side of the reading unit by reversing the document after a second passage through the reading unit; and a third step of passing the document returned in the second step through the reading unit, and then discharging the document.

According to an exemplary embodiment, a period of time required for reading document images can be shortened while suppressing enlargement of the conveying mechanism.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
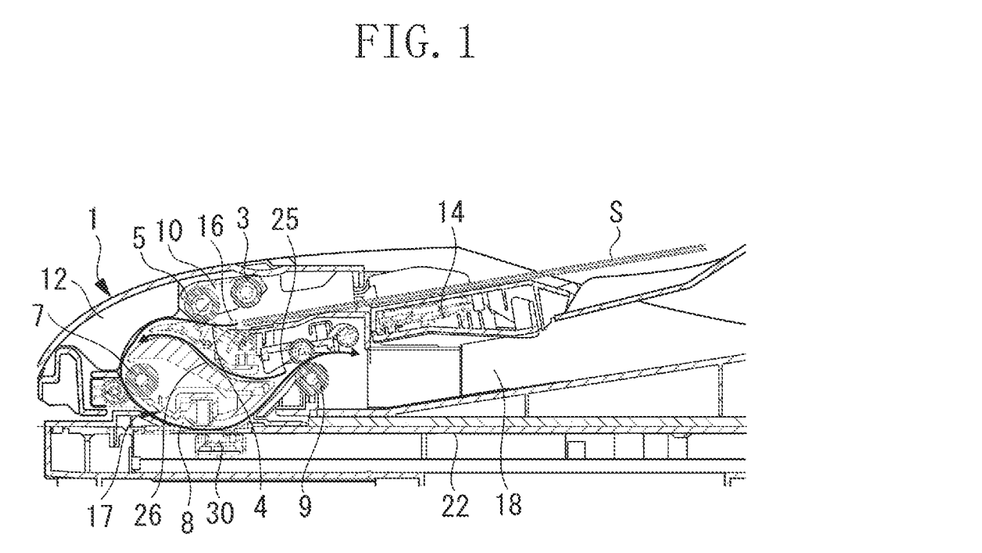
FIG. 1 schematically illustrates a configuration of an image reading apparatus that has a document conveying mechanism according to an embodiment.
Figure 2:
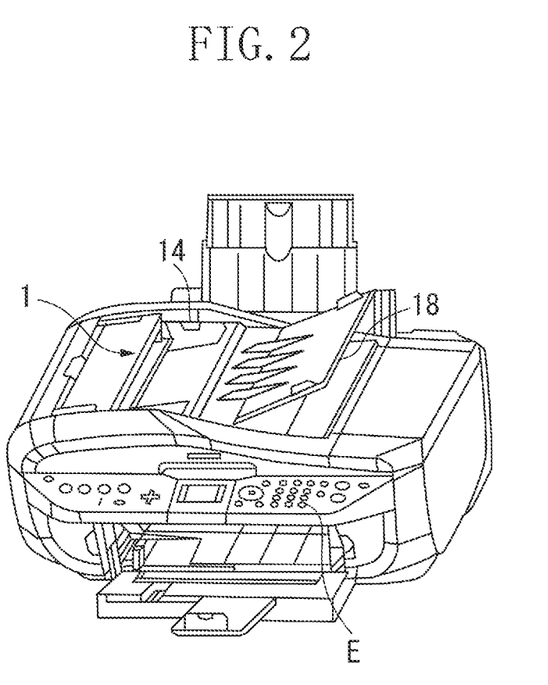
FIG. 2 schematically illustrates an appearance of the image reading apparatus illustrated in FIG. 1.

FIG. 1 schematically illustrates a configuration of an image reading apparatus that has a document conveying mechanism according to an embodiment. FIG. 2 schematically illustrates an appearance of the image reading apparatus illustrated in FIG. 1. First, a configuration and an operation of a conveying unit 1 are described.

The document conveying mechanism 1 includes a feed tray 14 on which a plurality of sheet documents S to be read are stacked, the conveying unit 1 on the downstream side of the feed tray 14 with respect to a conveyance path of the documents S, and a sheet discharge tray 18 (discharge tray) on the downstream side of the conveying unit 1, on which the read documents are stacked in order.

The conveying unit 1 includes a roughly U-shaped document conveyance path (hereinafter, "U-turn path") 12. The U-turn path 12 includes a separation roller 5 that is a feeding unit and a separation pad 4 in a position sandwiching the U-turn path 12 of the documents S to face the separation roller 5, which are pressed into contact with each other to separate top one of the documents S stacked on the feed tray 14. A document presence sensor 16 for detecting presence of the documents S is disposed more on the upstream side of the conveyance path than the separation roller 5. A first conveyance roller 7 for conveying the documents S is disposed on the downstream side of the separation roller 5. On the downstream side of the first conveyance roller 7, a document edge sensor 17 is disposed to detect leading and trailing edges of the documents S. On the most downstream side of the U-turn path 12, a second conveyance roller 9 is disposed to discharge the documents S to the sheet discharge tray 18 or convey the documents S to a reverse conveyance path 26 described below. The conveyance unit 1 further includes a branch unit 25 located on the downstream side of the second conveyance roller 9 of the U-turn path 12, and the reverse conveyance path 26 connected from this position to the U-turn path 12 between the separation roller 5 and the first conveyance roller 7.

The document edge sensor 17 and a white plate 8 are sequentially arranged between the first conveyance roller 7 and the second conveyance roller 9 on the U-turn path 12. In a position facing the white plate 8, a contact image sensor 30 of the image reading apparatus described below is disposed to read information on images formed on the documents S. The document edge sensor 17, the white plate 8, and the contact image sensor 30 constitute an image reading unit.

Between the U-turn path 12 and the feed tray 14, a pickup roller 3 that abuts on the top one of the documents S stacked on the feed tray 14 to pick it up is supported to be able to approach or move away from the document S by a pickup arm 10.

The image reading apparatus includes a flat reading glass 22 in addition to the document conveying mechanism. The document conveying mechanism is located on the reading glass 22. The document conveying mechanism can abut on or separate from the reading glass 22. The image reading apparatus includes the contact image sensor (hereinafter, "CIS") 30 that is an image reading unit located on a side facing the conveying unit 1 via the reading glass 22. The CIS 30 emits light to an image information surface of the document S from a light-emitting diode (LED) array that is a light source, and forms an image on a sensor element by light reflected on the image information surface via a self-focusing rod lens array. The CIS 30 can move in a direction (left and right direction illustrated) perpendicular to a width direction of the document S. Thus, during flat bed scanning where a user separates the document conveying mechanism from the reading glass 22 to set the document on reading glass 22 by himself, an image of a surface of the document placed on the reading glass 22 and in contact therewith is read while scanning from left to right illustrated. When the document S conveyed through the conveying unit 1 is read by utilizing the document conveying mechanism, the CIS 30 stops in an image reading position (position facing the white plate 8) illustrated in FIG. 1, and reads a surface of the CIS 30 side of the document S conveyed to the reading position.

Next, a driving system is described. A driving force from a drive motor (not illustrated) is transmitted to the separation roller 5, the pickup roller 3, the first conveyance roller 7, and the second conveyance roller 9 via a gear or a belt (not illustrated). The separation roller 5 and the pickup roller 3 are connected to the drive motor via an electromagnetic clutch. The driving force from the drive motor can be transmitted or cut off to the separation roller 5 and the pickup roller 3 by the electromagnetic clutch. The pickup roller 3, the separation roller 5, the second conveyance roller 9, and the first conveyance roller 7 are connected by a drive train (not illustrated) so that when the drive motor rotates forward, the first three rollers 3, 5 and 9 rotate clockwise illustrated in FIG. 1 while the roller 7 rotates counterclockwise. The first conveyance roller 7 also rotates counterclockwise when the drive motor rotates backward.

Next, an operation of the image reading apparatus is described. First, an operation when only an image formed on one surface of the document S is read is described. Hereinafter, when the document S is stacked on the feed tray 14, a surface of the document S directed to the feed tray 14 is a back surface, and a surface of the document S opposite the feed tray 14 is a front surface.

When the user sets a one-sided reading mode from an operation unit E to instruct start of reading, the drive motor rotates forward. At this time, the electromagnetic clutch is connected to rotate the separation roller 5 and the pickup roller 3, move a pickup arm 10 to the document S side, and then press the pickup roller 3 to the documents S. The documents S are fed into the U-turn path 12 by rotating the pickup roller 3. In this case, only top one of the documents S stacked on the feed tray 14 is fed into the conveyance path 1 by the separation roller 5 and the separation pad 4. The document S fed into the conveyance path 1 is conveyed on the U-turn path 12, and conveyed to a position opposite the CIS 30 by the first conveyance roller 7.

When the document presence sensor 16 determines no document, it means that the entire document S has been fed into the U-turn path 12. Thus, driving of the electromagnetic clutch is cut off to prevent feeding of a next document into the U-turn path 12. A document to be fed into the U-turn path 12 next after the conveyed document S is not conveyed until a driving force of the drive motor is transmitted again to the separation roller 5 and the pickup roller 3 by the electromagnetic clutch.

In the conveying unit 1, after the document edge sensor 7 detects a leading edge of the document S, when the document S is conveyed by a predetermined amount from its position, the CIS 30 starts reading an image from a surface of the document S while conveying the document S. After the document edge sensor 7 detects a trailing edge of the document S, when the document S is conveyed by a predetermined amount from its position, the CIS 30 ends reading of the image. The read document S is discharged to the discharge tray 8 by the second conveyance roller 9. After completion of reading of image information from the surface of the document S by the CIS 30, when the document S is conveyed by a predetermined amount, the driving force of the electromagnetic clutch is transmitted again to the separation roller 5 and the pickup roller 3, and conveyance of a next document is started to repeat the same operation described above.

Next, an operation when images are read from both surfaces of the document S is described. A process is similar to that of the one-sided reading from conveyance of the document S from the feed tray 14 through reading of an image from a first surface of the document S by the CIS 30 while the document S is conveyed by the first conveyance roller 7 to conveyance of the document S by the second conveyance roller 9. Then, in a two-sided reading mode, the drive motor is stopped immediately after a trailing edge of the document S conveyed by the second conveyance roller 9 passes through the branch unit 25, and rotated backward to stop and rotate the second conveyance roller 9 backward. When the second conveyance roller 9 rotates backward, the document S is conveyed to the reversal conveyance path 26 (second path). The document S is then conveyed, with front and back surfaces thereof reversed, to the U-turn path 12 on the upstream side of the first conveyance roller 7. The conveyance of the document S to the U-turn path 12 on the upstream side of the first conveyance roller 7 via the reversal conveyance path 26 by the second conveyance roller 9 is referred to as "reversal conveyance". When a leading edge of the document S reaches the first conveyance roller 7, and the first conveyance roller 7 starts conveying the document S, the second conveyance roller 9 is separated from the conveyance path by a moving unit (not illustrated) to rotate the drive motor forward. The document S is conveyed on the U-turn path 12, and the image reading unit located on a midway thereof reads an image from a second surface that is aback surface of the first surface. When the first conveyance roller 7 conveys the document S by a predetermine amount, the second conveyance roller 9 is moved to the conveyance path side. When the document S is long, during reversal, a portion of the document conveyed after completion of reading and a portion to be conveyed to the reversal conveyance path 26 overlap each other. However, as described above, the second conveyance roller 9 is separated from the conveyance path until the first conveyance roller 7 conveys the document S by a predetermined amount, and hence blocking of conveyance of the document S by the second conveyance roller 9 is prevented.

Figure 3:
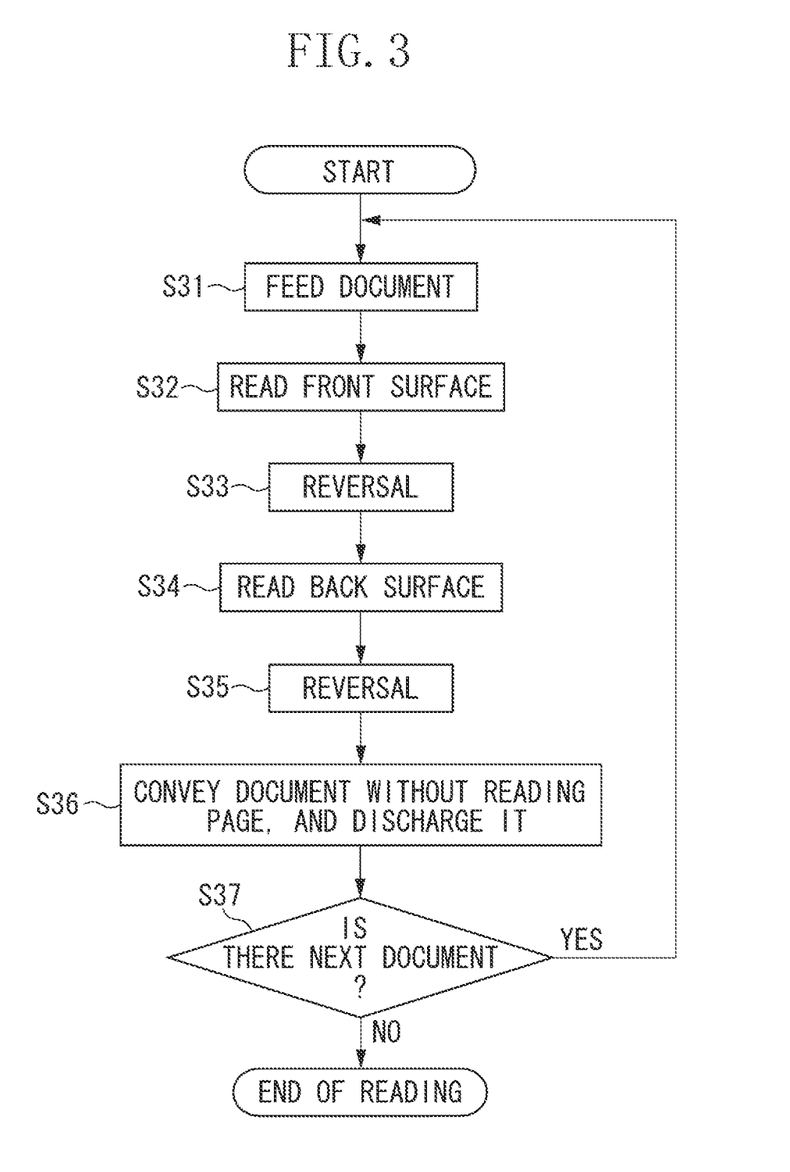
FIG. 3 is a flowchart illustrating an operation when images are continuously read from both surfaces of a plurality of documents in a two-sided image reading method according to an embodiment.

Next, referring to the flowchart of FIG. 3, an operation when a plurality of documents S are continuously conveyed to read images from both surfaces of the documents S is described.

First, in step S31, a first document S is fed from the feed tray 14. In step S32, the document S is conveyed by the first conveyance roller 7, and an image is read from a front surface of the document S by the CIS 30. In step S33, the document S is conveyed to the reversal conveyance path 26 by the second conveyance roller 9, and reversed to be conveyed, and front and back surfaces of the document S are reversed. In step S34, the document S is conveyed by the first conveyance roller 7, and an image is read from the back surface of the document S by the CIS 30. In step S35, the document S is conveyed to the reversal conveyance path 26 by the second conveyance roller 9, and reversed again to be conveyed, and the front and back surfaces of the document S are reversed. In step S36, "conveyance-without-reading" in which the document S only passes on the CIS 30 while no image is read is performed, and the document S is discharged to the discharge tray 18. When there is a document to be continuously read, the processing returns to step S31 of feeding the document S. When there is no document, in step S37, the processing is ended. Thus, by conveying the documents S three times on the CIS 30, the documents S are stacked on the discharge tray 18 in stacking order thereof on the feed tray 14.

A conveying flow of the document S is defined as follows. The processing from step S31 of feeding the document S from the feed tray 14 to step S33 of reversing the document to convey it is set as a first conveyance process. The processing from arrival of the document S at the U-turn path 12 after the first conveyance process to step S35 of reversing the document S to convey it is set as a second conveyance process. The processing from arrival of the document S at the U-turn path 12 after the second conveyance process to step S36 of discharging the document S to the discharge tray 18 is set as a third conveyance process. One surface of the document S faces the CIS 30 in the first and third conveyance processes, while the other surface of the document S faces the CIS 30 in the second conveyance process. In the first and second conveyance processes, the CIS 30 reads an image formed on the document S. In the third conveyance process, the CIS 30 cancels image reading, in other words, does not reach any image.

An electric unit according to the present exemplary embodiment includes a system control board for controlling a system of the entire apparatus, a printer control board for controlling a recording system, a power supply unit for supplying power to the apparatus, and an operation control board on which keys of an operation panel or a light-emitting diode (LED) is mounted.

Figure 4:
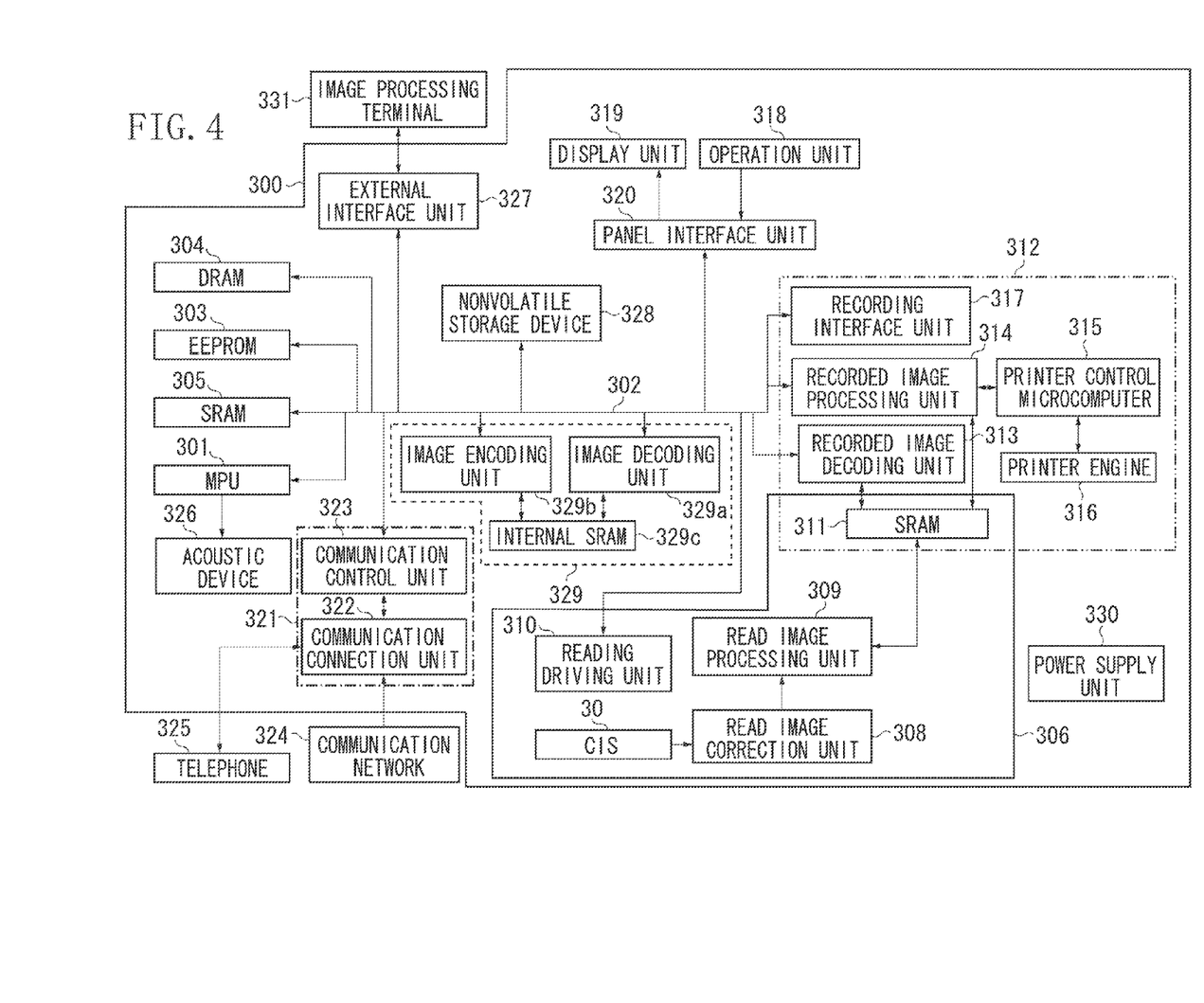
FIG. 4 is a block diagram illustrating a control configuration of a facsimile that is an example of an image communication apparatus according to an embodiment.

Next, referring to the block diagram of FIG. 4, a control configuration of a facsimile that is an example of an image communication apparatus including an image reading apparatus having a document conveying mechanism is described. In FIG. 4, a facsimile 300 includes a microprocessor unit (MPU) 301 of a control unit for controlling the entire apparatus. The MPU 301 controls the entire facsimile 300 via a system bus 302.

The facsimile 300 includes an electrically erasable programmable read-only memory (EEPROM) 303, a dynamic random access memory (DRAM) 304, and a static random access memory (SRAM) 305. The EEPROM 303 stores program code for operating the MPU 301, initial value data, table data, an image reading mode table, or a threshold value of a document interval. The DRAM 304 used for an image buffer or an image memory is used as a buffer for temporarily storing data when data transmission/reception is performed with an image processing terminal 331. The DRAM 304 is also used as a memory for storing image data received via a communication unit 321, image data read from a reading mechanism 306 or image data transmitted from an image processing terminal 331. The SRAM 305 is used as a user registration data area or a work area. The DRAM 304 and the SRAM 305 are protected from accidental failures such as a blackout by a battery backup.

The reading mechanism 306 includes the CIS 30, a read image correction unit 308, a read image processing unit 309, a reading driving unit 310, and an SRAM 311. The reading mechanism 306 drives the reading driving unit 310 to move the CIS 30, and optically reads image information of the document S by the CIS 30 to convert it into an electric image signal. The read image correction unit 308 performs shading correction for the signal. The read image processing unit 309 performs image processing to output high-definition image data. The SRAM 311 is used as a buffer when the image processing is performed.

An ink jet recording unit 312 includes the SRAM 311, a recorded image decoding unit 313, a recorded image processing unit 314, a printer control microcomputer 315, a printer engine 316, and a recording interface unit 317. The recorded image decoding unit 313 converts run-length image data into raw mage data. The recorded image processing unit 314 converts the raw data into high-definition image data by image processing such as resolution conversion, image magnification, smoothing, or density correction. The SRAM 311 is used as a buffer for such data conversion. The printer control microcomputer 315 includes a recording control MPU for controlling each operation of the ink jet recording unit 312, and a read-only memory (ROM) for storing various instructions to perform recording control. The printer control microcomputer 315 further includes a unit for reading an instruction from the ROM, a processing unit for processing the read instruction, a random access memory (RAM) for storing information needed by the processing unit, and an output unit for outputting a signal generated by the processing unit. By these units, a signal for performing recording control of the printer engine 316 is input/output. The recording interface unit 317 associates the printer control microcomputer 315 with the MPU 301.

An operation unit 318 includes various key switches such as a numeric keypad, instructs an operation of the facsimile 300, and inputs various pieces of information. A display unit 319 includes a liquid crystal display (LCD) and an LED, and displays a state of the facsimile 300. A panel interface unit 320 associates the operation unit 318 and the display unit 319 with the MPU 301.

The communication unit 321 includes a communication connection unit 322 such as a line connector and a communication control unit 323 such as a modulation/demodulation device, and performs line control. A communication network 324 and a telephone 325 are connected to the communication connection unit 322. An acoustic device 326 includes a speaker, and acoustically notifies the apparatus user of various states.

An external interface unit 327 transfers data between the MPU 301 and the image processing terminal 331 to control the facsimile 300 from the image processing terminal 331. A nonvolatile storage device 328 is a large-capacity nonvolatile memory used for storing image information, and no information is lost therefrom even when power is cut off. An image encoding/decoding unit 329 for encoding/decoding image data includes an image decoding unit 329$a$, an image encoding unit 329$b$, and an internal SRAM 329$c$.

The facsimile 300 includes a power supply unit 330 for supplying power, and the image processing terminal 331 such as a computer connected to the outside.

Operations of the facsimile classified into a scan capturing operation, a copying operation, a facsimile transmission operation, a facsimile reception operation, and a printing operation are described.

Scan Capturing Operation

The scan capturing operation outputs read image data of the document S to the image processing terminal 331 such as a computer.

The image data of the document S read by the CIS 30 of the reading mechanism 306 is subjected to shading correction by the read image correction unit 308, and to binarization and image conversion by the read image processing unit 309. The image data is input to the image encoding unit 329$b$ of the image encoding/decoding unit 329. The input image data is rasterized in the internal SRAM 329$c$, compressed to be encoded by the image encoding unit 329$b$, and stored in the DRAM 304. Simultaneously, management information of the image data is stored in the SRAM 305. The image encoded data stored in the DRAM 304 is decompressed to be decoded by the image decoding unit 329$a$ of the image encoding/decoding unit 329, and rasterized as image data in the internal SRAM 329$c$. The rasterized image data is output through the external interface unit 327 to the image processing terminal 331.

Copying Operation

The copying operation records the read image data of the document S on recording paper.

The image data of the document S read by the CIS 30 of the reading mechanism 306 is subjected to shading correction by the read image correction unit 308, and to binarization and image conversion by the read image processing unit 309. The image data is input to the image encoding unit 329$b$ of the image encoding/decoding unit 329. The input image data is rasterized in the internal SRAM 329$c$, compressed to be encoded by the image encoding unit 329$b$, and stored in the DRAM 304. Simultaneously, management information of the image data is stored in the SRAM 305. The image encoded data stored in the DRAM 304 is decompressed to be decoded by the image decoding unit 329$a$ of the image encoding/decoding unit 329, and rasterized as image data in the internal SRAM 329$c$. The rasterized image data is subjected to correction and image conversion by the recorded image processing unit 314, and then recorded on recording paper by the printer engine 316 under control of the printer control microcomputer 315.

Facsimile Transmission Operation

The facsimile transmission operation transmits the read image data of the document S to the outside.

The image data of the document S read by the CIS 30 of the reading mechanism 306 is subjected to shading correction by the read image correction unit 308, and to binarization and image conversion by the read image processing unit 309. The image data is input to the image encoding unit 329$b$ of the image encoding/decoding unit 329. The input image data is rasterized in the internal SRAM 329$c$, compressed to be encoded by the image encoding unit 329$b$, and stored in the DRAM 304. Simultaneously, management information of the image data is stored in the SRAM 305. The image encoded data stored in the DRAM 304 is modulated by the communication control unit 323, and a procedure signal of facsimile communication is transmitted/received. Then, the image data is transmitted bit by bit from the communication control unit 323 through the communication connection unit 322.

Facsimile Reception Operation

The facsimile reception operation records data transmitted from the outside on recording paper.

Data received from the outside is input to the communication control unit 323 through the communication connection unit 322. A procedure signal of facsimile communication is transmitted/received, and then reception of image data is started. The image data is demodulated by the communication control unit 323, and transferred bit by bit to a reception buffer of the DRAM 304 under control of the MPU 301 according to an input interruption signal from the communication control nit 323. The reception data transferred to the reception buffer is decompressed to be decoded by the image decoding unit 329a of the image encoding/decoding unit 329 to inspect an image error, and rasterized as image data in the internal SRAM 329c. The rasterized image data is subjected to correction and image conversion by the recorded image processing unit 314, and then output to the recording paper by the printer engine 316 under control of the printer control microcomputer 315.

Printing Operation

The printing operation records data from the image processing terminal 331 on recording paper.

The image processing terminal 331 transmits a command and a reception parameter bit by bit to the external interface unit 327. The command and the reception parameter received by the external interface unit 327 are transferred bit by bit to the reception buffer of the DRAM 304 under control of the MPU 301 according to an input interruption signal from the external interface unit 327. The command contains a command code for identifying each command, and a size of the subsequent reception parameter, and the reception parameter contains a setting value or image data necessary for executing an operation for each command. The reception parameter except the command and the image data, which has been transferred to the reception buffer, is processed by the MPU 301. When a content of the reception parameter is image data, encoded data or raw data constituting the image data is decompressed to be decoded by the image decoding unit 329a of the image encoding/decoding unit 329 according to image data format information indicated by the reception parameter received beforehand, and then rasterized as image data in the internal SRAM 329c. The rasterized image data is subjected to correction and image conversion by the recorded image processing unit 314, and then output to the recording paper by the printer engine 316 under control of the printer control microcomputer 315. Simultaneously, the rasterized image data is compressed to be encoded by the image encoding unit 329b of the image encoding/decoding unit 329. Then, the image data is stored in the DRAM 304, and management information of the image data is stored in the DRAM 304. After the command reception, a response to the command and a transmission parameter are generated to be transmitted.

There are following responses:

(1) OK response indicating acceptance of the received command;

(2) NG response indicating nonacceptance because the received command is an error; and (3) BUSY response indicating nonacceptance of the received command at present because of a busy state.

The transmission parameter contains, as a result of transmission or printing, attributes of a file or a page, apparatus information corresponding to the instructed command, a cancellation request, or a retransmission request. A response is set in a transmission buffer of the DRAM 304 by the MPU 301, transferred bit by bit to the external interface unit 327 under control of the MPU 301 according to an input interruption signal from the external interface unit 327, and then transmitted to the image processing terminal 331.

Figure 5:
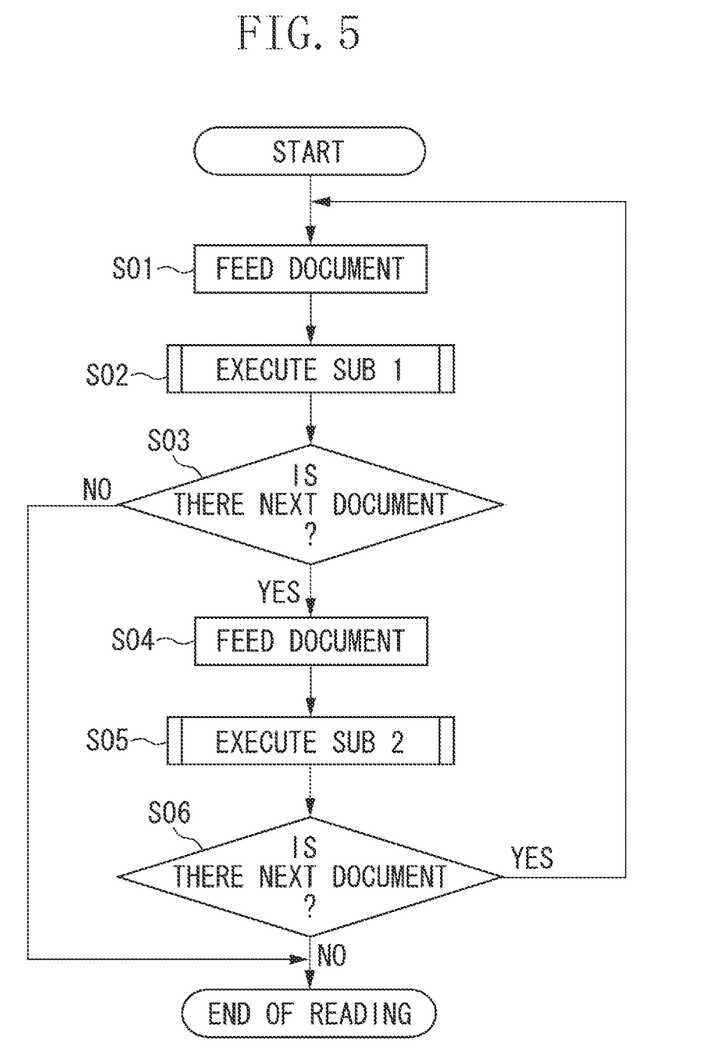
FIG. 5 is a flowchart illustrating a main routine when a higher speed is set for the two-sided image reading method for a plurality of images according to an embodiment.
Figure 6A:
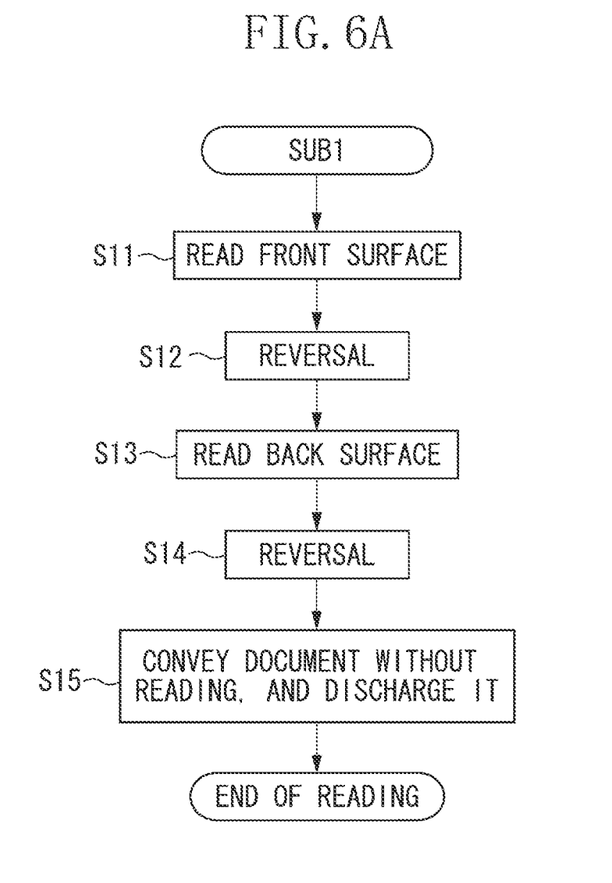
FIGS. 6A and 6B are flowcharts illustrating sub-routines (Sub 1 and Sub 2) included in the main routine illustrated in FIG. 5.
Figure 6B:
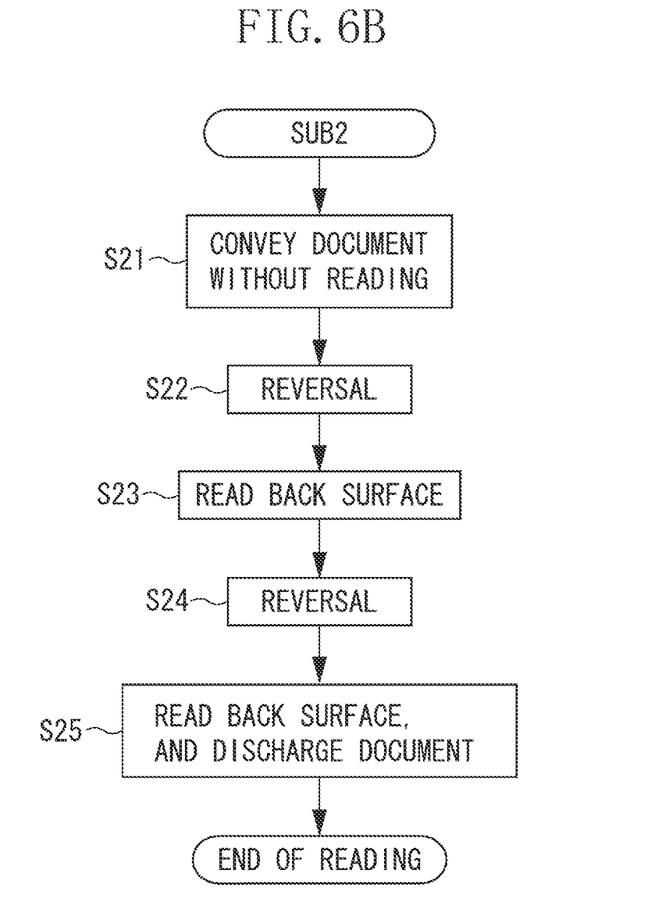

Next, referring to FIG. 5 and FIGS. 6A and 6B, an image reading method in which continuous image reading from a plurality of documents is faster according to the present embodiment is described.

FIG. 5 is a flowchart illustrating a main routine when image reading from a plurality of document is faster, and FIGS. 6A and 6B illustrate subroutines included in the main routine illustrated in FIG. 5: FIG. 6A illustrating a subroutine 1 (Sub 1), and FIG. 6B illustrating a subroutine 2 (Sub 2).

First, the subroutine 1 (Sub 1) is described. In the subroutine 1 (Sub 1), a document S is read by the same procedure as that illustrated in the flowchart of FIG. 3. Specifically, in step S11, an image is read from a front surface of a conveyed document S. In step S12, the document S is reversed to change front and back surfaces. In step S13, an image is read from the back surface of the document S. In step S14, the document S is reversed to change the front and back surfaces. Then, in step S15, "conveyance-without-reading" in which no image is read from the document S is performed to discharge the document S to the discharge tray 18.

In other words, in the subroutine 1, an operation of returning the document fed from the feed tray 14 and conveyed to the conveyance path 12 on the downstream side of the image reading unit 30 to the upstream side of the image reading unit 30 by the reversal conveyance path 26 and conveying the document on the conveyance path 12 is repeated twice. By repeating the operation of reversing the document to return to the conveyance path twice, the same document passes through the image reading unit 30 three times. During first and second passage of the document through the image reading unit 30, images are read from the front and back surfaces of the document S.

Next, the subroutine 2 (Sub 2) is described.

First, in step S21, conveyance-without-reading in which no image is read from the document S is performed. In step S22, the document S is reversed to change front and back surfaces. In step S23, an image is read from the back surface of the document S. In step S24, the document S is reversed to change the front and back surfaces. Then, in step S25, an image is read from the front surface of the document S, and the document S is directly discharged to the discharge tray 18.

In other words, in the subroutine 2, an operation of returning the document fed from the feed tray 14 and conveyed to the conveyance path 12 on the downstream side of the image reading unit 30 to the upstream side of the image reading unit 30 by the reversal conveyance path 26 and conveying the document on the conveyance path 12 is repeated twice. By repeating the operation of reversing the document to return to the conveyance path twice, the same document passes through the image reading unit 30 three times. During second and third passage of the document through the image reading unit 30, images are read from the front and back surfaces of the document S.

FIG. 5 illustrates the main routine for loading the processing illustrated in FIG. 6A or FIG. 6B. First, in step S01, the document S stacked on the feed tray 14 is fed. In step S02, the subroutine 1 (Sub 1) is loaded to execute a content of the subroutine 1 (Sub 1). After the execution, in step S03, whether there is a next document on the feed tray 14 is determined. In step S04, the processing is ended when there is no next document, while the document is fed from the feed tray 14 when there is a next document. In step S05, the subroutine 2 (Sub 2) is loaded to execute a content of the subroutine 2. After the execution, in step S06, whether there is a next document on the feed tray 14 is determined. When there is no next document, the processing is finished. When there is a next document, the processing returns to step 01 of feeing the document stacked on the feed tray 14. The same procedure is repeated until all the documents S stacked on the feed tray 14 are read.

As in the abovementioned case, the processing from feeding of the document S from the feed tray 14 to reversal of the document to convey it is set as a first conveyance process. The processing from arrival of the document S at the U-turn path 12 after the first conveyance process to reversal of the document S to convey it is set as a second conveyance process. The processing from arrival of the document S at the U-turn path 12 after the second conveyance process to discharging of the document S to the discharge tray 18 is set as a third conveyance process. When the subroutine 1 (Sub 1) is executed, as in the abovementioned case, one surface of the document S faces the CIS 30 in the first and third conveyance processes, while the other surface of the document S faces the CIS 30 in the second conveyance process. In the first and second conveyance processes, the CIS 30 reads an image from the document S. When the subroutine 2 (Sub 2) is executed, one surface of the document S faces the CIS 30 in the first and third conveyance processes, while the other surface of the document S faces the CIS 30 in the second conveyance process. However, when the subroutine 2 (Sub 2) is executed, no image is read from the document S in the first conveyance process, while an image is read from the document S in the second and third conveyance processes. In other words, the two subroutines (Sub 1) and (Sub 2) for reading images from the document S in different conveyance processes are alternately executed.

In the subroutines (Sub 1) and (Sub 2), an order of reading images from the front and back surfaces of the document S is changed. Thus, to reproduce the read image data without changing the order of the front and back surfaces of the document S, the order of the read image data must be changed as follows: with respect to a reading order of:

first front-first back-second back-second front . . .
first-front-first back-second front-second back . . .

The order change is implemented by storing both front and back images of the second page of the document S, and changing an order of pieces of image information transmitted to an output destination at the time of outputting the image information. By transmitting a page order changing command to a transmission destination, the images can be rearrayed at the transmission destination.

When any one of the subroutine 1 (Sub 1) and the subroutine 2 (Sub 2) is executed, the document S is conveyed on the CIS 30 three times. Thus, the documents S are stacked on the discharge tray 18 in a stacking order on the feed tray 14.

Figure 7A:
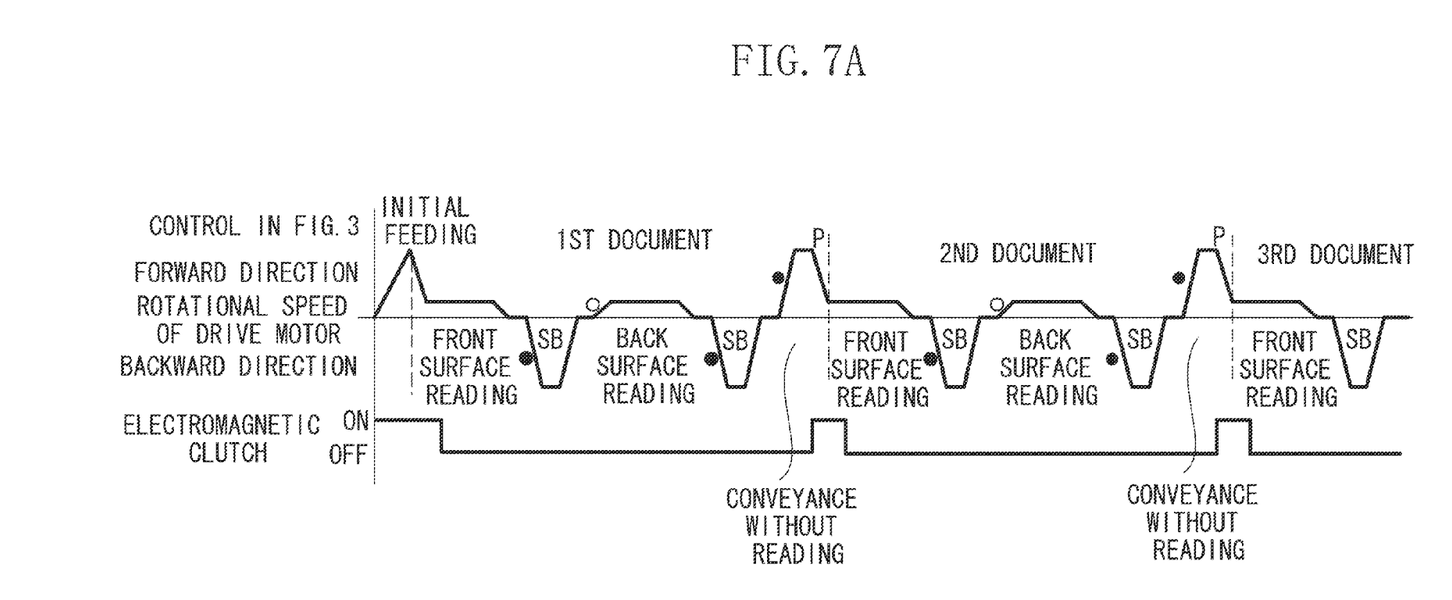
FIGS. 7A and 7B are timing charts illustrating a rotational speed of a drive motor and ON-OFF of an electromagnetic clutch when control illustrated in FIG. 3 is performed and when control illustrated in FIG. 5 is performed, respectively.
Figure 7B:
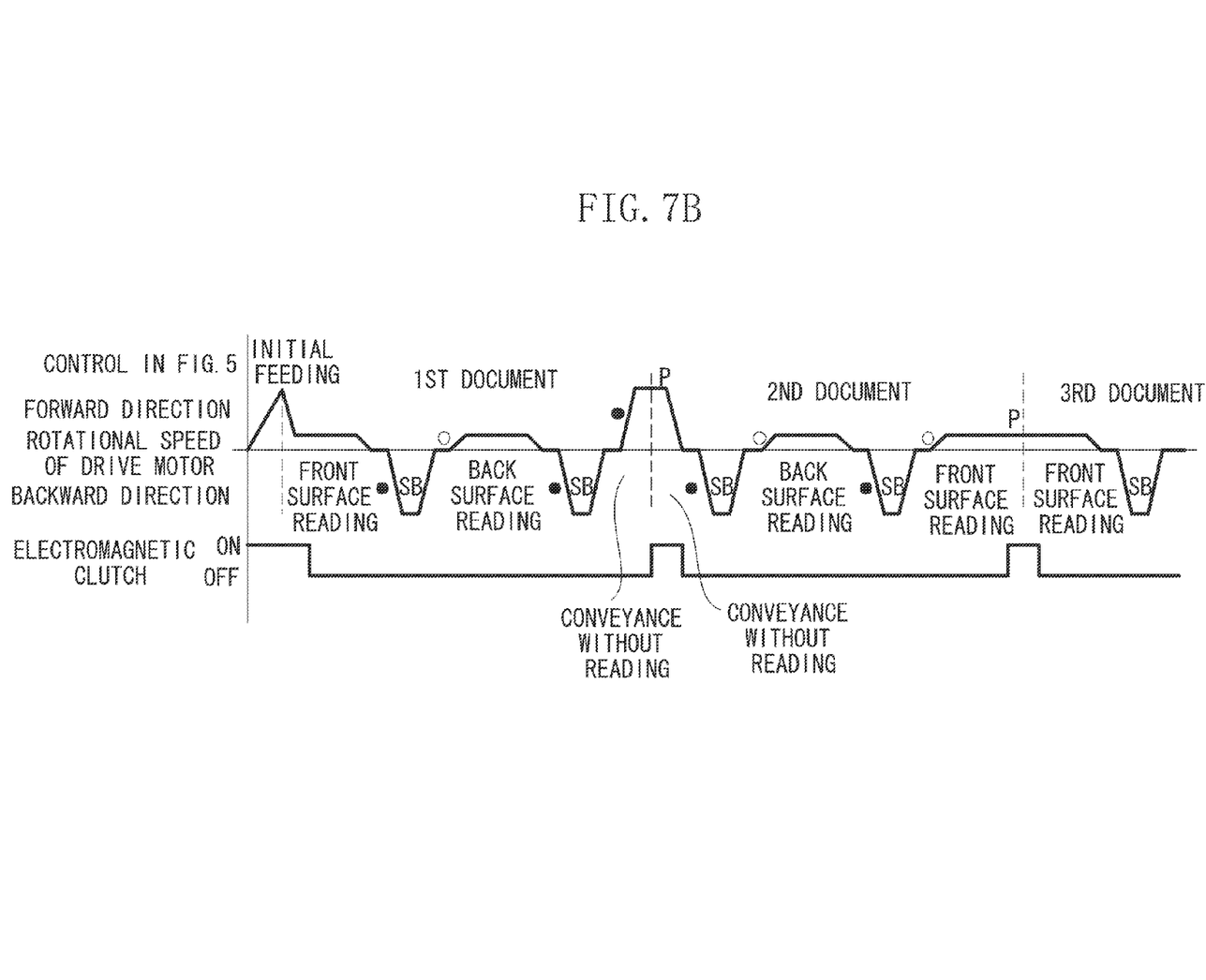

FIGS. 7A and 7B are timing charts illustrating a rotational speed of the drive motor and ON-OFF of the electromagnetic clutch for transmitting driving to the separation roller 5 and the pickup roller 3: FIG. 7A when control illustrated in FIG. 3 is performed, and FIG. 7B when control illustrated in FIG. 5 is performed. In the present exemplary embodiment, to shorten a period of time required for reading an image from the document S, a conveying speed of the document S is faster during conveyance-without-reading and picking-up (document S is conveyed from the feed tray 14) than during image reading from the document S. FIGS. 7A and 7B illustrate a pickup P and a reversal operation SB. A black circle (filled circle) indicates an acceleration state of the drive motor from a stop to a high speed to convey the document S fast, and a white circle (unfilled circle) indicates an acceleration state of the drive motor from the stop to a low speed to read an image from the document S.

In the first document illustrated in FIG. 7B, an image is read during first and second passage of the document through the image reading unit 30. After the second passage through the image reading unit 30, the document is conveyed on the reversal conveyance path 26, and the speed is accelerated to a higher speed when the document is conveyed without reading during third passage through the image reading unit 30 than during the first and second passage through the image reading unit 30. When the electromagnetic clutch is turned ON to transmit driving to the separation roller 5 and the pickup roller 3 while the drive motor rotates at a high speed, the second (succeeding) document is, as in the case of the first (preceding) document, fed fast to pass through the image reading unit 30.

In the case of performing the control illustrated in FIG. 5 with respect to the case of simply repeating the control illustrated in FIG. 3 (refer to FIG. 7A), when image reading from the document S is compared between two documents, a period of time until the second document S is discharged to the discharge tray 18 is shortened. The number of acceleration times (number of black circles) of the drive motor to high-speed rotation indicated by the black circles is smaller. This is achieved by continuously executing, in a state where the drive motor rotates fast without any stop between the first and second documents, conveyance-without-reading and discharging of the first document and picking-up and conveyance-without-reading of the second document.

Thus, the two-sided image reading method for implementing the control illustrated in FIG. 5 enables shortening of the period of time for reading when the plurality of documents S are continuously conveyed to read images therefrom. Reducing the number of acceleration times of the drive motor for conveying the document S fast enables reduction of an operation sound of the drive motor that tends to generate large sounds.

As compared with the conventional technology, the number of paths laid for conveyance of the document S from the feed tray 14 to the discharge tray 18 is smaller. Thus, a reading speed of the document S can be faster without increasing the apparatus size as compared with the conventional case.

In the exemplary embodiment, the method for controlling the documents S by two sheets (refer to FIG. 5) is implemented from reading of the first document S. However, control can be performed to implement the method for arbitrary two continuous documents among a plurality of documents S. Depending on a transmission destination of the read image, the control illustrated in FIG. 5 and the control illustrated in FIG. 3 can be switched.

In the control illustrated in FIG. 5, a start of reading from a front surface of the second document is slower than that in the control illustrated in FIG. 3. For example, when images of the document S are transmitted while being read during facsimile transmission (direct transmission), the read images must be transmitted in order of read pages. Thus, when a data amount of the first document S is small, transmission of the first document may be ended before an image is read from the front surface of the second document, and the processing may stand by for data of the second document. In such a case, not implementing the control illustrated in FIG. 5 enables reduction of a possibility of a slow transmission end. When image data are started to be transmitted collectively after reading of all the documents (memory transmission), control is advisably executed so that reading of all the pages can be completed fast.

In other words, in the image communication apparatus according to the exemplary embodiment, the direct transmission and the memory transmission can be selectively implemented. Thus, the image data can be efficiently transmitted faster.

In the memory transmission, by transmitting the images while changing the page order of the document S stored in the memory during the transmission, the images set in the page order can be reproduced without executing any special control for the device at the transmission destination.

In both of the direct transmission and the memory transmission, the document S is conveyed on the CIS 30 three times. Thus, the documents S are stacked on the discharge tray 18 in the stacking order on the feed tray 14.

In the case of scan reading, a status command indicating in which mode the document communication apparatus operates is transmitted to the image processing terminal such as a scanner function device driver of the facsimile operated in a personal computer. This way, the images read from the document S can be sequentially transmitted without being rearrayed at the image communication apparatus, and rearrayed by the personal computer to be set as images of a series of continuous pages.

By the control described above, an image communication apparatus can be provided, which is fast in reading of the document S and does not need any large memory in an image communication apparatus body.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-141505 filed Jun. 22, 2010, which is hereby incorporated by reference herein in its entirety.

What is claimed is:

1. A method comprising:
a first step of passing a document through a reading unit and returning the document to an upstream of the reading unit;
a second step of passing the document returned in the first step through the reading unit and returning the document to the upstream of the reading unit; and
a third step of passing the document returned in the second step through the reading unit, and then discharging the document,
wherein, in one of the first and third steps, the reading unit reads an image formed on a first surface of the document and, in the other of the first and third steps, the reading unit does not read the image formed on the first surface of the document,
wherein, in the second step, the reading unit reads an image formed on a second surface of the document, wherein the second surface is a back surface of the first surface of the document, and
wherein a speed of passage through the reading unit without reading the image in one of the first and third steps is higher than a speed of passage through the reading unit in the other of the first and third steps.

2. The method according to claim 1, wherein the second step includes changing a document front and a document back of the document.

3. The method according to claim 2, wherein, in the first and third steps, the document passed through the reading unit is accelerated faster when no image is read than when an image is read.

4. The method according to claim 2,
wherein, for a fed first document, an image is read from the first surface in the first step, and an image is read from the second surface in the second step, while no image is read in the third step, and
wherein, for a second document fed after the fed first document, no image is read in the first step, while an image is read from the second surface in the second step and an image is read from the first surface in the third step.

5. A method comprising:
a first step of returning a fed document to an upstream side of a reading unit by reversing the document after a first passage of the document through the reading unit;
a second step of returning the document returned in the first step to the upstream side of the reading unit by reversing the document after a second passage of the document through the reading unit; and
a third step of passing the document returned in the second step through the reading unit, and then discharging the document,
wherein a first mode and a second mode are selectable,
wherein, in the first mode, for a fed first document, an image is read from a first surface to store image data in a memory in the first step, and an image is read from a second surface, that is a back surface of the first surface, to store image data in the memory in the second step, while no image is read in the third step, and for a second document fed after the first document, no image is read in the first step, an image is read from the second surface to store image data in the memory in the second step, an image is read from the first surface to store image data in the memory in the third step, and then a plurality of image data stored in the memory is transmitted collectively, and
wherein, in the second mode, for each of a plurality of fed documents, an image is read from the first surface to transmit image data in the first step, and an image is read from the second surface to transmit image data in the second step, while no image is read in the third step.

6. The method according to claim 5, wherein, in the first mode, the plurality of read image data is changed in order to be transmitted.

7. The method according to claim 5, wherein, in the second mode, the plurality of read image data is not changed in order to be transmitted.

8. An apparatus comprising:
a first path including a reading unit on a midway, through which a document passes;
a second path disposed separately from the first path and configured to return the document passed through the reading unit of the first path to an upstream of the reading unit; and
a control unit configured to perform control to execute a first step of passing a document through the reading unit and returning the document to an upstream of the reading unit,
a second step of passing the document returned in the first step through the reading unit and returning the document to the upstream of the reading unit, and
a third step of passing the document returned in the second step through the reading unit, and then discharging the document,
wherein, in one of the first and third steps, the reading unit reads an image formed on a first surface of the document and, in the other of the first and third steps, the reading unit does not read the image formed on the first surface of the document, wherein, in the second step, the reading unit reads an image formed on a second surface of the document, wherein the second surface is a back surface of the first surface of the document, and wherein a speed of passage through the reading unit without reading the image in one of the first and third steps is higher than a speed of passage through the reading unit in the other of the first and third steps.

9. An image communication apparatus comprising:
the apparatus according to claim 8; and
a communication device having a facsimile function.

10. The image communication apparatus according to claim 9, wherein the control unit performs control to change a plurality of read image data in order before transmitting the read image data.

11. The apparatus according to claim 8, wherein the control unit performs control such that:
for a fed first document from a feed tray, an image is read from the first surface in the first step, and an image is read from the second surface in the second step, while no image is read in the third step, and
for a second document fed from the feed tray after the first document, no image is read in the first step, while an image is read from the second surface in the second step and an image is read from the first surface in the third step.

12. The apparatus according to claim 11, wherein the control unit performs control to pass, in the first and third steps, the document through the reading unit faster when no image is read than when an image is read.

13. The apparatus according to claim 11, wherein the control unit performs control to feed a next document from the feed tray faster when no image is read in the third step than when an image is read.

14. A method comprising:
a first step of passing a document through a processing unit and returning the document to an upstream of the processing unit;
a second step of passing the document returned in the first step through the processing unit and returning the document to the upstream of the processing unit; and
a third step of passing the document returned in the second step through the processing unit, and then discharging the document,
wherein, in one of the first and third steps, the processing unit processes an image formed on a first surface of the document, while the image is not process in the other of the first and third steps,
wherein, in the second step, the processing unit processes an image formed on a second surface of the document, wherein the second surface is a back surface of the first surface of the document, and
wherein a speed of passage through the processing unit without processing the image in one of the first and third steps is higher than a speed of passage through the processing unit in the other of the first and third steps.

15. An image reading apparatus comprising:
a feed tray on which a document is stacked;
an image reading unit configured to read an image of the document;
a discharge tray on which the document is stacked after reading of the image:
a conveyance path through which the document conveyed from the feed tray through the image reading unit to the discharge tray passes;
a reversal conveyance path through which the document passing through the conveyance path on a downstream side of the image reading unit is reversed to be returned to the conveyance path on an upstream side of the image reading unit; and
a document conveying mechanism configured to repeat, twice, an operation of returning the document fed from the feed tray and conveyed to the conveyance path on the downstream side of the image reading unit to the upstream side of the image reading unit via the reversal conveyance path, and conveying the document through the conveyance path again, to convey the document so that the same document passes through the image reading unit three times, and then to discharge the document to the discharge tray,
wherein (i) a control operation to read images of both surfaces of the document by reading, while the document is conveyed by the document conveying mechanism to be discharged to the discharge tray, images of both surfaces of the document during first and second passage through the image reading unit, and (ii) a control operation to read images of both surfaces of the document by reading images of the document during second and third passage through the image reading unit, are alternately performed.

16. The image reading apparatus according to claim 15, wherein the document is accelerated faster when no image is read than when an image is read during passage through the image reading unit.

17. The image reading apparatus according to claim 16, further comprising a feeding unit configured to feed the document from the feed tray to the conveyance path,
wherein the feeding unit feeds a next document faster when no image is read than when an image is read during third passage of a preceding document through the image reading unit.

18. A method comprising:
passing a first document through a reading unit to read a first surface of the first document;
reversing the first document;
passing the first document through the reading unit to read a second surface of the first document opposite to the first surface;
reversing the first document;
passing the first document through the reading unit without reading and discharging the first document;
passing a second document through the reading unit without reading;
reversing the second document;
passing the second document through the reading unit to read a second surface of the second document opposite to the first surface of the second document;
reversing the second document; and
passing the second document through the reading unit to read the first surface of the second document and discharging the second document,
wherein a speed of passage through the reading unit by the first and second document without reading is faster than a speed of passage through the reading unit while a reading is performed.

19. The method according to claim 18, wherein a passage of the first document and the second document without reading is continuously executed without any stop between the first document and the second document.

20. The method according to claim 19, wherein a passage of the first document and the second document without reading is continuously executed without any deceleration between the first document and the second document.

* * * * *